US012267404B2

(12) United States Patent
Galloway et al.

(10) Patent No.: US 12,267,404 B2
(45) Date of Patent: *Apr. 1, 2025

(54) TRANSPARENT INLINE CONTENT INSPECTION AND MODIFICATION IN A TCP SESSION

(71) Applicant: International Business Machines Corporation, Armonk, NY (US)

(72) Inventors: Gregory Lyle Galloway, Cumming, GA (US); Paul Coccoli, Marietta, GA (US); David Allen Dennerline, Sandy Springs, GA (US); Steven Ashley Mazur, Johns Creek, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/458,624

(22) Filed: Jul. 1, 2019

(65) Prior Publication Data

US 2019/0327347 A1 Oct. 24, 2019

Related U.S. Application Data

(63) Continuation of application No. 14/512,504, filed on Oct. 13, 2014, now Pat. No. 10,382,591.

(51) Int. Cl.
*H04L 69/16* (2022.01)
*H04L 9/40* (2022.01)

(52) U.S. Cl.
CPC .......... *H04L 69/16* (2013.01); *H04L 63/1416* (2013.01); *H04L 63/1441* (2013.01)

(58) Field of Classification Search
CPC .. H04L 69/16; H04L 63/1441; H04L 63/1416
(Continued)

(56) References Cited

U.S. PATENT DOCUMENTS 5,835,726 A * 11/1998 Shwed ................ H04L 63/0263
726/13
6,182,139 B1 1/2001 Brendel
(Continued)

FOREIGN PATENT DOCUMENTS

WO WO-2012095904 A1 * 7/2012 ........... H04L 1/1867

OTHER PUBLICATIONS

IBM, List of IBM Patents or Patent Applications Treated as Related, Appendix P, 2 pages, filed herewith, Oct. 15, 2024.

*Primary Examiner* — Wing F Chan
*Assistant Examiner* — John Fan
(74) *Attorney, Agent, or Firm* — Lily Neff (57) ABSTRACT

A network appliance is configured to provide inline traffic inspection for all flow through the device, to selectively intercept based on traffic content or policy, and to modify intercepted traffic content, all without connection termination and re-origination. Content modification may involve substitution of traffic content with smaller or larger content, in which case the device provides appropriate sequence number translations for acknowledgements to the endpoints. This streaming rewrite may occur on a byte-at-a-time basis, while keeping the session alive and without a need to proxy it. The appliance enables transmitted TCP data to be modified inline and then reliably delivered without the overhead of forwarding packets through a full-blown TCP stack. Rather, the approach relies upon an initiator entity's TCP stack for congestion control, as well as the receiving entity's re-transmission behavior to determine how the device manages packets internally.

18 Claims, 4 Drawing Sheets

(58) Field of Classification Search
USPC ........................................................ 709/231
See application file for complete search history.

(56) References Cited

U.S. PATENT DOCUMENTS

| | | | |
|---|---|---|---|
| 6,246,684 B1* | 6/2001 | Chapman | H04L 47/10 370/363 |
| 6,829,238 B2 | 12/2004 | Tokuyo et al. | |
| 7,055,027 B1* | 5/2006 | Gunter | H04L 63/0428 709/223 |
| 7,480,301 B2 | 1/2009 | Krishnan et al. | |
| 7,535,907 B2* | 5/2009 | Hussain | H04L 49/90 370/392 |
| 7,711,844 B2* | 5/2010 | Schuehler | H04L 69/16 709/238 |
| 7,738,380 B1* | 6/2010 | Dubrovsky | H04L 69/16 370/235 |
| 7,969,976 B2 | 1/2011 | Ishikawa et al. | |
| 8,320,384 B2 | 11/2012 | Oouchi et al. | |
| 8,379,515 B1* | 2/2013 | Mukerji | H04L 47/323 370/229 |
| 2006/0130064 A1* | 6/2006 | Srivastava | H04L 67/1008 718/102 |
| 2008/0222532 A1 | 9/2008 | Mester et al. | |
| 2010/0325217 A1 | 12/2010 | Mody et al. | |
| 2011/0276699 A1* | 11/2011 | Pedersen | H04L 47/24 709/227 |
| 2012/0216275 A1 | 8/2012 | Boscolo et al. | |
| 2013/0080656 A1* | 3/2013 | Kukreja | G06F 40/274 709/232 |
| 2013/0227689 A1 | 8/2013 | Pietrowicz et al. | |
| 2014/0325588 A1* | 10/2014 | Jalan | H04L 63/1458 726/1 |
| 2015/0071273 A1* | 3/2015 | Hencinski | H04L 1/1854 370/338 |

* cited by examiner

TRANSPARENT INLINE CONTENT INSPECTION AND MODIFICATION IN A TCP SESSION

BACKGROUND OF THE INVENTION

Technical Field

This disclosure relates generally to information security on network-connected appliances.

Background of the Related Art

Security threats are continually evolving. With the rapid growth of cutting-edge web applications and increased file sharing, activities that may have been considered harmless in the past could become potential openings for attackers. Traditional security means, such as anti-malware software and firewalls, have become easier to bypass. Thus, there is a significant need for more advanced, proactive threat protection that can help provide comprehensive security against new and emerging threats.

Network-connected, non-display devices ("appliances") are ubiquitous in many computing environments. For example, appliances built purposely for performing traditional middleware service oriented architecture (SOA) functions are prevalent across certain computer environments. SOA middleware appliances may simplify, help secure or accelerate XML and Web services deployments while extending an existing SOA infrastructure across an enterprise. The utilization of middleware-purposed hardware and a lightweight middleware stack can address the performance burden experienced by conventional software solutions. In addition, the appliance form-factor provides a secure, consumable packaging for implementing middleware SOA functions. One particular advantage that these types of devices provide is to offload processing from back-end systems. To this end, it is well known to use such middleware devices to perform computationally expensive processes related to network security. For example, network intrusion prevention system (IPS) appliances are designed to sit at the entry points to an enterprise network to protect business-critical assets, such as internal networks, servers, endpoints and applications, from malicious threats. Such devices can provide inline content inspection and modification for various purposes, such as to neutralize or eliminate from network traffic malicious, offensive or otherwise objectionable content, decrypt encrypted (SSL/TLS) network traffic to perform security inspection, inject content (e.g., advertisements, and security notifications), and the like.

Traditional network content and inspection and modification has been performed using network proxies, which often suffer from poor performance and lack of scalability, and that require either client reconfiguration or deployment of a transparent gateway device. Performance in such devices is impacted negatively by the proxy's requirements for data copying, buffering, context switching, and connection termination and re-origination. The lack of scalability is a consequence of the proxy's connection termination and re-origination, as well as its dependency on often-limited operating system resources such as network buffer, file descriptors, socket handles, and TCP ports. TCP session handling in such devices requires full implementation of the TCP/IP stack, including TCP timers. Terminating network proxies typically also require manual configuration, which increases deployment and maintenance costs, as a connection proxy requires two separate IP addresses. Depending on where the device must be deployed, the cost may be significant. Such devices also are not easily provisioned into cloud-based deployments.

BRIEF SUMMARY

A network appliance is configured to provide inline traffic inspection for all flow through the device, to selectively intercept based on traffic content (or policy), and to modify intercepted traffic content, all without connection termination and re-origination. Content modification may involve substitution of traffic content with smaller or larger content, in which case the device provides appropriate sequence number translations for acknowledgements to the endpoints. This streaming rewrite may occur on a byte-at-a-time basis, while keeping the session alive and without a need to proxy it. The appliance enables transmitted TCP data to be modified inline and then reliably delivered without the overhead of forwarding packets through a full-blown TCP stack. Rather, the approach relies upon an initiator (sending) entity's TCP stack for congestion control, as well as the receiving entity's re-transmission behavior to determine how the device manages packets internally.

In an exemplary embodiment, the appliance is configured between a sending entity and a receiving entity and is operative during a TCP session to inspect a TCP traffic stream. Upon determining that a portion of the stream comprising one or more input data packets received from the sending entity is to be rewritten, the one or more data packets are place in an input substitution record. As each input data packet is placed into the input substitution record, an acknowledgement message is returned to the sending entity; however, an acknowledgement message is not sent for the last input data packet that constitutes the portion of the stream that is to be rewritten. A modified portion of the stream is then generated from the one or more input data packets in the input record. The modified portion of the stream comprises one or more output data packets to be sent to the receiving entity. The one or more output data packets are placed in an output record. These output data packets are then output into the TCP traffic stream to the receiving entity. As each output data packet is acknowledged by the receiving entity, the output record corresponding to the output data packet is cleared. Upon receipt of acknowledgements from the receiving entity for each output data packet in the output record, an acknowledgement of the last input data packet is then transmitted back to the sending entity. Thus, instead of maintaining TCP timer per connection, an appliance that implements the described technique uses the presence of retransmitted packets and acknowledgement messages from the endpoints to know when to retransmit its own rewritten data content, or to know when to release the memory for that rewritten content.

In this approach, a number of input data packets constituting the portion of the stream to be rewritten may differ from a number of output data packets constituting the modified portion of the stream. In such case, a sequence number delta (that occurs as a result of a number of bytes in the output record differing from a number of bytes in the input record) is maintained, and that sequence number delta is applied with respect to an acknowledgement returned to the sending entity as needed.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
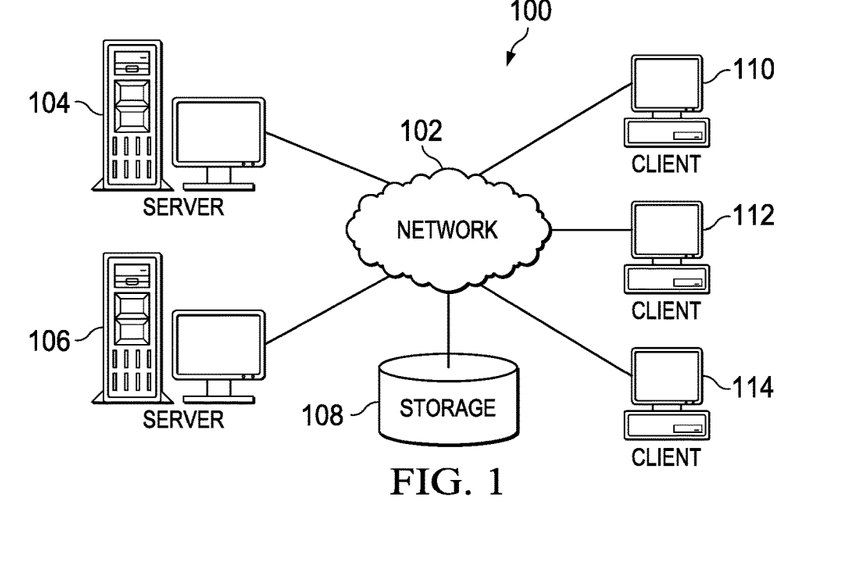
FIG. 1 depicts an exemplary block diagram of a distributed data processing environment in which exemplary aspects of the illustrative embodiments may be implemented.
Figure 2:
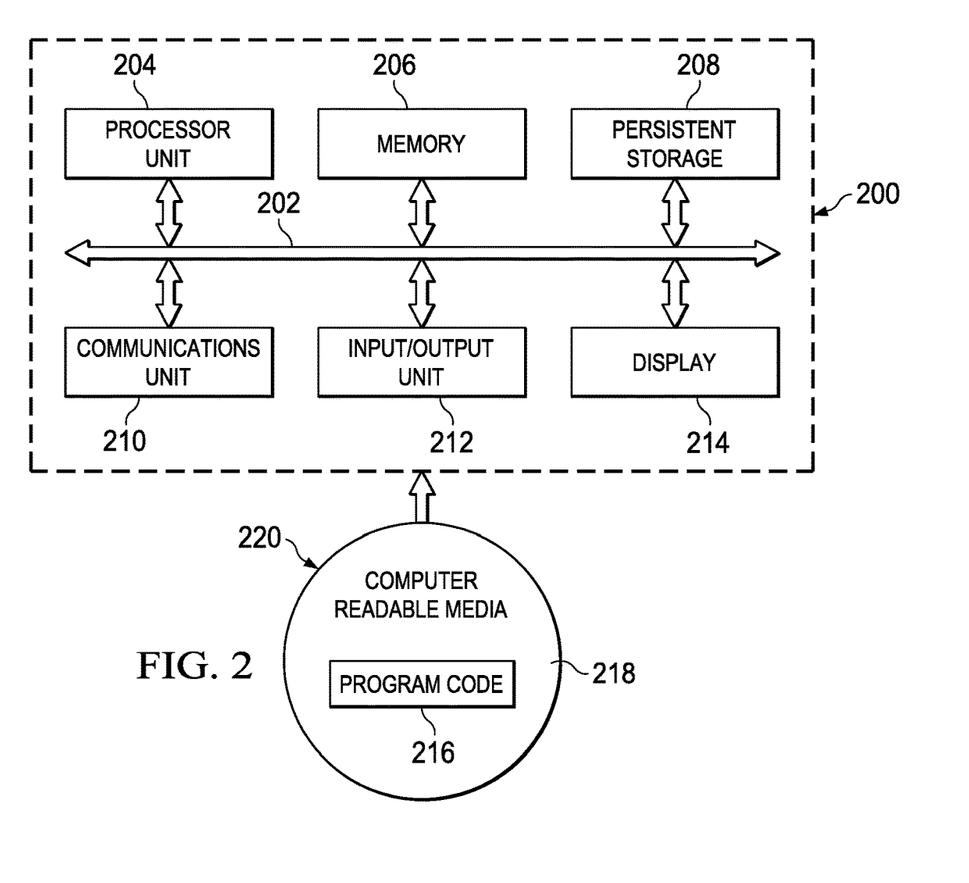
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Network-Connected Secure Appliances

A network appliance typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

Figure 3:
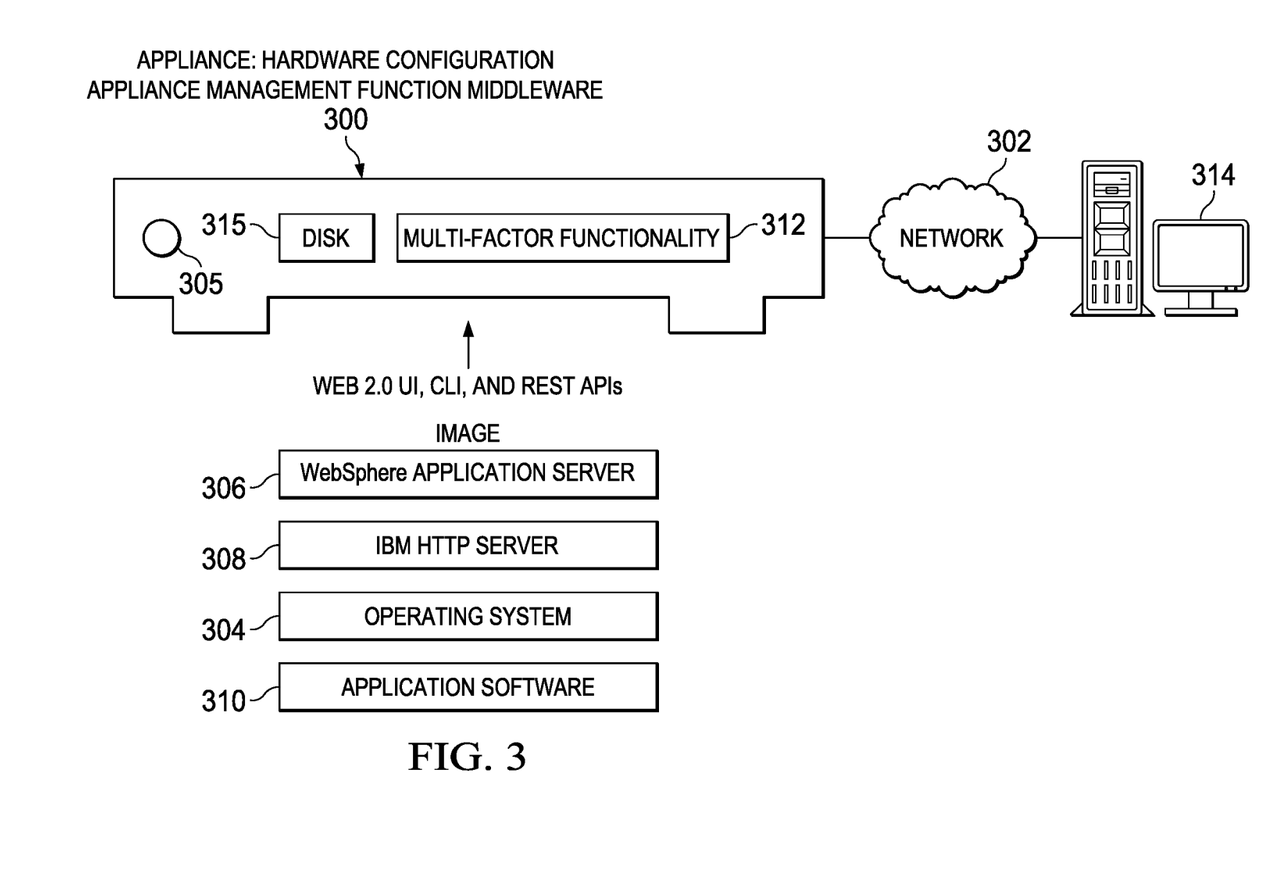
FIG. 3 illustrates an exemplary network-based appliance in which the disclosed subject matter may be implemented.

Referring to FIG. 3, a representative operating environment includes the physical appliance 300, which interfaces to a network 302. The appliance may be implemented using a data processing system such as described above with respect to FIG. 2, and it may represent one of the servers (or clients) shown in FIG. 1. Typically, the appliance 300 includes a Web 2.0-based user interface (UI), a command line interface (CLI), and REST-based application programming interfaces (APIs). In this example, the appliance has been provisioned with an image comprising an operating system 304, an application server 306, an HTTP server 308, and other application programs 310. Additional software solutions (not shown) may be included within the image. These software elements may come pre-loaded on the appliance, which may include other data (e.g., templates, scripts, files, etc.). The particular software configuration of course will depend on the use being made of the appliance. The appliance includes one of more storage devices (e.g., disk 315). The type and number of storage devices may vary.

While the appliance illustrated in FIG. 3 is shown a physical device, this is not a limitation, as a virtual (e.g., cloud-based) implementation thereof may also be configured using cloud resources.

TCP

The following provides further background to the subject matter of this disclosure.

Transmission Control Protocol/Internet Protocol (TCP/IP) has become a widely implemented standard communication protocol in Internet and Intranet technology, enabling broad heterogeneity between clients, servers, and the communications systems coupling them. Transmission Control Protocol (TCP) is the transport layer protocol and Internet Protocol (IP) is the network layer protocol. TCP builds a connection-oriented transport level service to provide guaranteed, sequential delivery of a byte stream between two IP hosts, such as the client and server shown in FIG. 1. The service is implemented in a particular host by a TCP stack supported by the operating system kernel. Application data is sent to TCP, broken into segments sequenced by segment numbers, and packetized into TCP packets before being sent to the IP network layer protocol. IP provides a "datagram" delivery service at the network level.

Reliability in data transmission over TCP/IP can be compromised by three events: data loss, data corruption, and reordering of data. Data loss is managed in TCP/IP by a time-out mechanism. In particular, the TCP stack maintains a timer (a retransmission timer) to measure the delay in receiving an acknowledgment (ACK) of a transmitted segment from the receiver. When an ACK does not arrive within an estimated time interval (the retransmission time-out (RTO)), the corresponding segment is assumed to be lost and is retransmitted. Further, because TCP is traditionally based on the premise that packet loss is an indication of network congestion, TCP will back-off its transmission rate by entering "slow-start," thereby drastically decreasing its congestion window to one segment. TCP manages data corruption by performing a checksum on segments as they arrive at the receiver. On checksum, the TCP sender computes the checksum on the packet data and puts this 2-byte value on the TCP header. The checksum algorithm is a 16-bit one's complement of a one's complement sum of all 16-bit words in the TCP header and data. The receiver computes the checksum on the received data (excluding the 2-byte checksum field in the TCP header) and verifies that it matches the checksum value in the header. The checksum field also includes a 12-byte pseudo header that contains information from the IP header (including a 4-byte "source IP" address, 4-byte "destination IP" address, 2-byte payload length, 1-byte protocol field).

TCP manages reordering of data or out-of-order arrival of segments by maintaining a reassembly queue that queues incoming packets until they are rearranged in sequence. Only when data in this queue gets in sequence is it moved to a receive buffer where it can be seen. When the receiver observes a "hole" in the sequence numbers of packets received, the receiver generates a duplicate acknowledgement (DACK) for every "out-of-order" packet it receives. Until the missing packet is received, each received data packet with a higher sequence number is considered to be "out-of-order" and will cause a DACK to be generated. Packet reordering is a common occurrence in TCP networks given the prevalence of parallel links and other causes of packet reordering. In TCP, any data packets following one that has been lost or reordered are queued at the receiver until the missing packet arrives. The receiver then acknowledges all the queued packets together.

In TCP, flow control is the procedure of handling the mismatch in processing and buffering capacities between a receiver and a transmitter to best utilize the bandwidth provided by the transmission medium. TCP flow control mechanisms operate exclusively at the end stations to limit the rate at which TCP endpoints emit data. TCP, however, lacks explicit data rate control. The basic flow control mechanism is a "sliding window", superimposed on a range of bytes beyond the last explicitly acknowledged byte. The sliding window limits the maximum number of sequential bytes between the byte most recently sent from the server to the earliest byte for which a receipt acknowledgment has not yet been received from the client. This sliding operation limits the amount of unacknowledged transmissible data that a TCP endpoint can emit. A receiving host, during a connection setup phase, informs the transmitting host its buffer capacity relating to the "maximum" number of packets that can be outstanding (unacknowledged) at any given time. This is the receiver or sliding window size. The transmitter maintains a transmission window whose current size is an estimate of how many packets can be pumped into the network without waiting for an acknowledgment (ACK). A variety of algorithms are used to automatically re-send packet and slowly restart data transmission when the sliding window limit is exceeded. Thus, if the link between the server and client is shut down in the middle of transmission of a data collection, the server will stop sending packets within one sliding window of the last packet acknowledged by the client. This use of a sliding window inherently limits the bandwidth of a data transfer through the network.

Transparent Inline Content Inspection and Modification in a TCP Session

With the above as background, the subject matter of this disclosure is now described.

Figure 4:
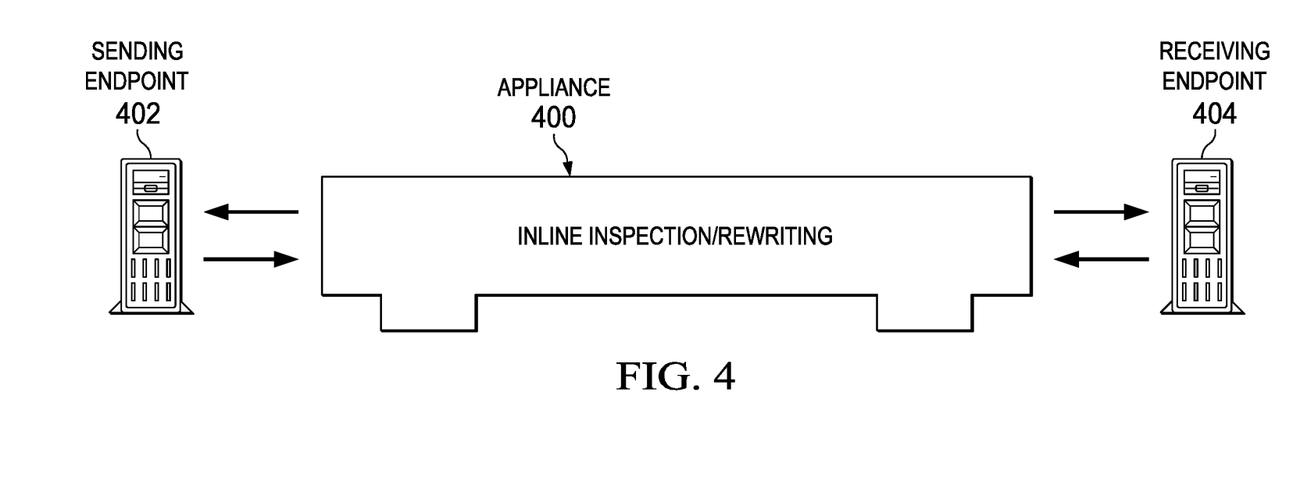
FIG. 4 illustrates a network appliance that provides inline inspection and content rewriting according to this disclosure.

As seen in FIG. 4, the transparent inline content inspection and modification occurs within an appliance 400 positioned between a first computing entity 402, and a second computing entity 404. Computing entities 402 and 404 (sometimes referred to endpoints) operate as senders and receivers, and each such entity includes a TCP stack. Appliance 400 may be configured as a physical device, a virtual device, or some combination thereof. In a representative embodiment, appliance is a network appliance such as shown in FIG. 3, and it includes the hardware and software components shown in FIG. 2. Unlike the endpoints, the appliance does not require a TCP stack. In an alternative embodiment, the appliance includes a TCP stack that is not utilized in the below-described operations.

As will be seen, the approach herein provides for TCP session rewriting in the appliance while keeping the stream flowing through the device alive. The technique works without requiring connection termination or re-origination, i.e., without the requirement of a proxy. As noted above, the approach provides for inspection and rewrite of arbitrary content, despite the lack of the TCP stack. A network appliance of this type (i.e., inline) typically has one or more pairs of network interfaces that are used for inspecting packets that traverse the appliance. Each pair of network interfaces typically inspects one network segment. The inline network appliance acts generally as a layer 1 (L1) repeater. Thus, packets that are received on one port of the pair are inspected and then forwarded out onto the network via the other port in the pair, and vice versa. In a L1 repeater, forwarding and routing decisions are only made using the physical port on which a packet is received (as compared to L2 switches, which use hardware machine (MAC) addresses from the L2 header, and L3 routers, which use IP addresses from the L3 header, for these purposes). Any Ethernet L1 (802.1q) or tunneled headers are cloned. This means that any packet modified by the appliance has identical routing characteristics as the source packet.

Using the approach of this disclosure, a network appliance (operating inline) inspects TCP sessions and arbitrarily rewrites session content without interrupting the session. Unlike proxy solutions, this approach is not limited by the number of available ports or file descriptors. It is only limited by the amount of memory and CPU cycles that are available in the appliance. As a result, the method has greater network throughput, greater connections per second, and a greater maximum number of connections as compared to proxy-based and other approaches. Further, and as will be seen, the approach allows for inspection of TCP sessions that occur on any port and can therefore detect network protocols that occur on non-standard ports (e.g. HTTP not over port 80, or HTTPS not over 443). Moreover, the method can start rewriting content at any point upon session initialization or even after the session has already been established (e.g. after the initial three-way TCP handshake), and it does not alter the 5-tuples of the session (protocol, source/destination IP, and source/destination port). As a result, the method is not as easily detectable by other network devices, and it is less likely to cause problems with other network access control devices (e.g. firewalls). Because the appliance works at L1, tunneled protocols (e.g., VXLAN and GRE) can be integrated into this solution without incurring hardware and configuration costs associated with terminating or re-originating TCP connections.

Thus, in normal operation the inline network appliance provides a virtual "bump-in-the-wire" (BITW) because all packets flow through the inline network appliance unmodified.

The method can be used for a number of different applications including, but not limited to, detecting and removing malware, detecting and removing confidential/proprietary data (e.g. preventing data leakage), decrypting encrypted (SSL/TLS) sessions so that security inspection can be performed, and all the various others provided by known inspection devices. Thus, for example, the device 400 includes a protocol analysis module (e.g., IBM Security Network Protection PAM), which provides a packet inspection function to identify and mitigate network threats. The particular details of any such application (or the inspection module itself) module are not an aspect of this disclosure.

As described above, because TCP is a reliable transport layer, the TCP/IP stacks of clients and servers on the network are responsible for acknowledgement of data that they receive and retransmission of data that gets lost. As also explained, the TCP/IP stacks accomplish this by implementing a number of timers for each connection, including a retransmission timer. The retransmission timer is started when an end point sends data. If the data is not acknowledged when the timer expires, the originating end point will retransmit the data.

When inspecting traffic with the inline network appliance 400 of this disclosure, these acknowledgement messages flow back and forth through the appliance unmodified. Rather, the endpoints (i.e., the clients and servers on either side of the appliance) preferably are solely responsible for all retransmission of the packets that they generate. In a first mode of operation, the inline network appliance 400 operates in a passive mode, eavesdropping on the conversations between the clients and servers. The network appliance 400 includes one or more inspection algorithms depending on what the appliance is provisioned or configured to do. Thus, e.g., an inspection algorithm may be implemented to detect malware, or to detect a TLS HELLO message, or the like), and to take action (e.g., a content rewrite) accordingly. Once the network appliance decides (based on its one or more data inspection algorithms) that it wants to start rewriting a TCP session, the appliance transitions into a second mode of operation in which appliance becomes responsible for the rewritten content and must insure that it is retransmitted if necessary. The approach herein accomplishes this retransmission of rewritten content without the use of a TCP/IP stack and its associated timers. To this end, the method maintains a TCP connection tracking table, which keeps track of the sequence numbers in both directions for each connection. Instead of a retransmission timer per connection (which adds overhead and limits the maximum number of connections that can be inspected), the subject technique monitors and tracks endpoint-generated retransmitted packets and acknowledgement messages as they flow through the inline network appliance. The approach uses the presence of these endpoint-generated retransmitted packets and acknowledgement messages to know when to retransmit its own rewritten data content, or to know when to release the memory for that rewritten content.

When the inline network appliance detects network traffic that is deemed malicious or that violates a user-prescribed business policy, the appliance can block that traffic (using conventional blocking techniques). Thus, for example, the appliance blocks traffic by dropping the current packet, and marking the particular session as blocked in the appliance's connection tracking table so that any future packets received on the session also will be blocked. Optionally, the appliance also can send a TCP reset (RST) message back to the original client or server, or both.

Generalizing, any TCP session flowing through the appliance is in one of two states: NORMAL, and REWRITING. When packets are received for a TCP session that is in the NORMAL state, the packets are inspected and forwarded to the original recipient. On the other hand, when the inspection algorithm(s) of the appliance detect content that needs to be rewritten, the state of the TCP session is switched from NORMAL to REWRITING. Once a TCP session is in a REWRITING state, it remains in that state for the remainder of the session. There is no requirement that the data inspection or rewrite begins at (or is aligned with) packet boundaries. During the inspection of an input packet, the inspection algorithm(s) of the appliance might decide that there is a need to rewrite a portion of the TCP stream starting somewhere inside a current packet.

Figure 5:
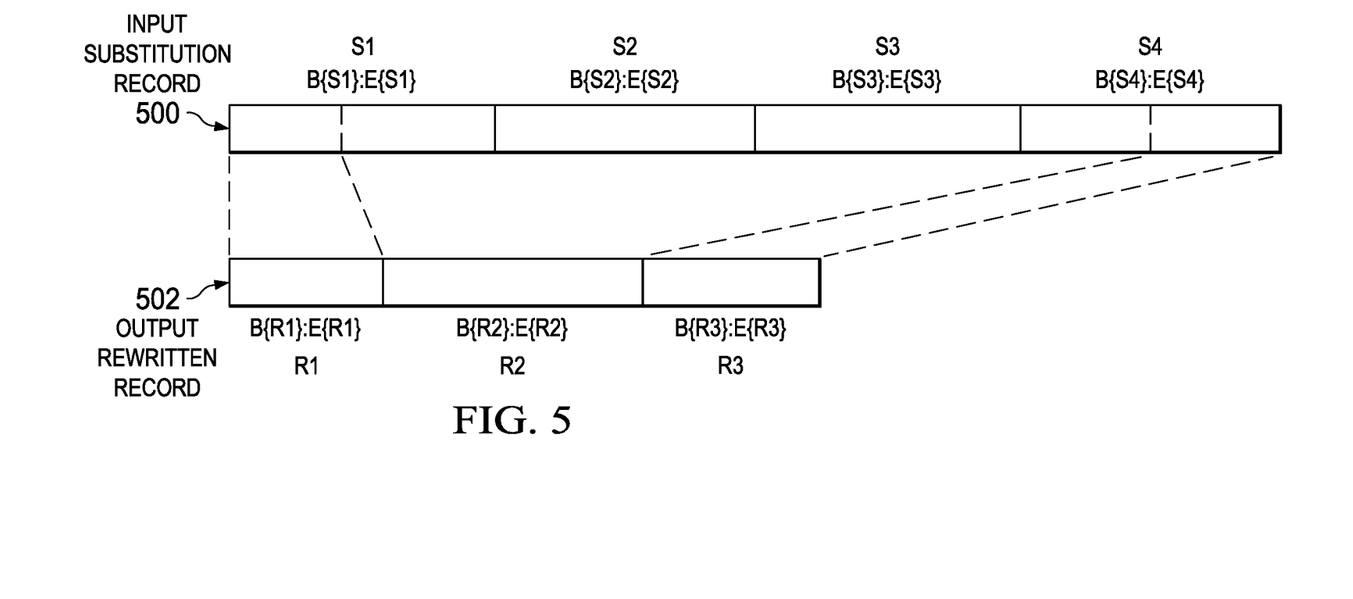
FIG. 5 illustrates how the network appliance uses an input substitution record to buffer one or more input data packets and to generate an output rewritten record during a content rewrite operation.

Referring to FIG. 5, and according to this disclosure in the REWRITING state the inline network appliance reads in an input substitution record 500, constituting one or more input data packets S1-S4, that is to be rewritten into an output rewritten record 502 of one or more output data packets. The number of output data packets in the output rewritten record 502 can be less than, equal to, or greater than the number of packets in the input substitution record 500. In the example shown in FIG. 5, the appliance reads in an input substitution record consisting of four (4) packets beginning at sequence number $B\_\{S1\}$ and ending at sequence number $E\_\{S4\}$. In this example, which is not intended to be limiting, it is assumed that the payload data that will be rewritten starts at sequence number $M\_\{S1\}$, somewhere roughly in the middle of packet 51, and ends at sequence number $M\_\{S4\}$, somewhere roughly in the middle of packet S4. All four of the original input data packets, S1 through S4, will be rewritten and replaced, but the data before $M\_\{S1\}$ and after $M\_\{S4\}$ will be preserved and copied to the new output data packets as shown. Once the inspection algorithm detects that it will rewrite the payload data, it starts buffering and holding the input data packets.

Because this is a TCP session (and the endpoints implement TCP slow-start), the appliance must send acknowledgement messages for at least some of the input data packets that it is buffering. According to this disclosure, the appliance sends acknowledgement messages (to the sending entity) for all but the last packet that make up the input substitution record 500. Failure to send this last acknowledgement message will eventually result in the client stopping transmission of the remaining packets, which will result in the inline network appliance waiting indefinitely. That said, the appliance does not send an acknowledgement message for the last packet of the input substitution record (S4 in this example). Once the appliance has received all the input data packets of the input substitution record 500 (and, of course, the number of such packets varies according to the desired rewrite), their payload data then is used to construct the new output payload, namely, the modified (or rewritten) portion of the stream. After the new output payload is constructed, the original packets of the input substitution record are discarded without forwarding to the original recipient. The appliance then breaks the new output payload into a set of output data packets, which as noted above constitute the output rewritten record 502. The number of output data packets is determined based on the maximum segment size (MSS) for this TCP session, which the appliance determines, for example, by examining the TCP headers of the session. In this example the output rewritten record 502 constitutes three new output data packets, R1 through R3. The beginning sequence number of the output rewritten record, namely, $B\_\{R1\}$, is the same as the beginning sequence number of the input substitution record 500, namely, $B\_\{S1\}$. In future input substitution records, this correspondence is not maintained, as will be seen.

One or more input substitution records may be written for the TCP session, resulting in one or more output rewritten records for the system. The particular number and configuration for these records will depend on the content rewrite. In a typical inspection scenario, the appliance rewrites multiple records in both directions over the lifetime of each TCP session.

As this example scenario illustrates, the number of packets and the total number of bytes in the output rewritten record 502 does not have to match the same quantity in the input substitution record 500. Either quantity can be either less or greater, or the same. If the total number of bytes in the output rewritten record 502 does not match the total number of bytes in the input substitution record 500, then a sequence number delta is introduced for this particular side of the TCP stream at this point-in-time. Typically, this sequence number delta changes with each input substitution record that is rewritten for this TCP session. Because the appliance operates inline while the stream is alive, the appliance also performs sequence number translation on acknowledgement messages (that it sends in the opposite direction) to reverse the effect of this sequence number delta.

To this end, the appliance establishes and maintains in its working memory a substitution record table of input substitution records. The substitution record table comprises the beginning sequence number, $B\_\{S\}$, of the input substitution record, the ending sequence number, $E\_\{S\}$, of the input substitution record, the beginning sequence number, $B\_\{R\}$, of the output rewritten record, the ending sequence number, $E\_\{R\}$, of the output rewritten record, and a linked list of the memory buffers in the appliance memory which hold the packets that make up the output rewritten record.

Turning back to the example scenario, after completing the rewriting of the input data payload and breaking the result up into output data packets, R1 through R3, the appliance transmits these packets to the original receiver endpoint. These packets may exceed the window size of the recipient, which may result in the recipient only sending acknowledgement messages for a portion of these packets. Each acknowledgement message that is received from recipient results in a release of the corresponding memory buffer for the output data packet that it acknowledges. When all output packets have been acknowledged and released, the entry (for this rewrite operation) is removed from the substitution record table. The appliance then sends to the original sender a final acknowledgement message for the last packet (S(4)) in the input substitution record. If the original sender retransmits the last packet in the input substitution record (because it did not receive an acknowledgement from the appliance), the appliance drops this retransmitted packet. In this scenario (when the appliance receives a retransmission by the sending entity of the last packet in the input substitution record before all output data packets have been acknowledged), the appliance retransmits any and all packets of the output rewritten record that have not yet been acknowledged and released by the receiving entity.

If the original sender retransmits an earlier packet (not the last data packet) constituting part of the input substitution record, then this indicates that an earlier acknowledgement message sent by the appliance was lost. In this case, preferably the appliance retransmits to the original sender the acknowledgement message for all but the last packet back.

As explained above, in a typical TCP session, data packets can arrive in a different order from which they were sent due to packets taking multiple paths through a network. In normal TCP, the client and server's TCP/IP stacks will buffer these out-of-order packets and perform TCP reassembly so that the TCP data is always delivered to the application in order. In a similar manner, the appliance preferably also buffers out-of-order input data packets and reassembles them so that the inspection algorithm(s) of the appliance operate on data in order. Thus, when out-of-order packets are received on a TCP session that is in the NORMAL state, these packets are buffered for reassembly, and then immediately forwarded to the original recipient to be reassembled by the recipient. When out-of-order packets are received on a TCP session that is in the REWRITING state, preferably these packets are buffered for reassembly and rewriting, and then dropped. Because e the TCP session is in a REWRITING state, the original, not-yet-rewritten, packets are not forwarded on to the receiving endpoint.

Figure 6:
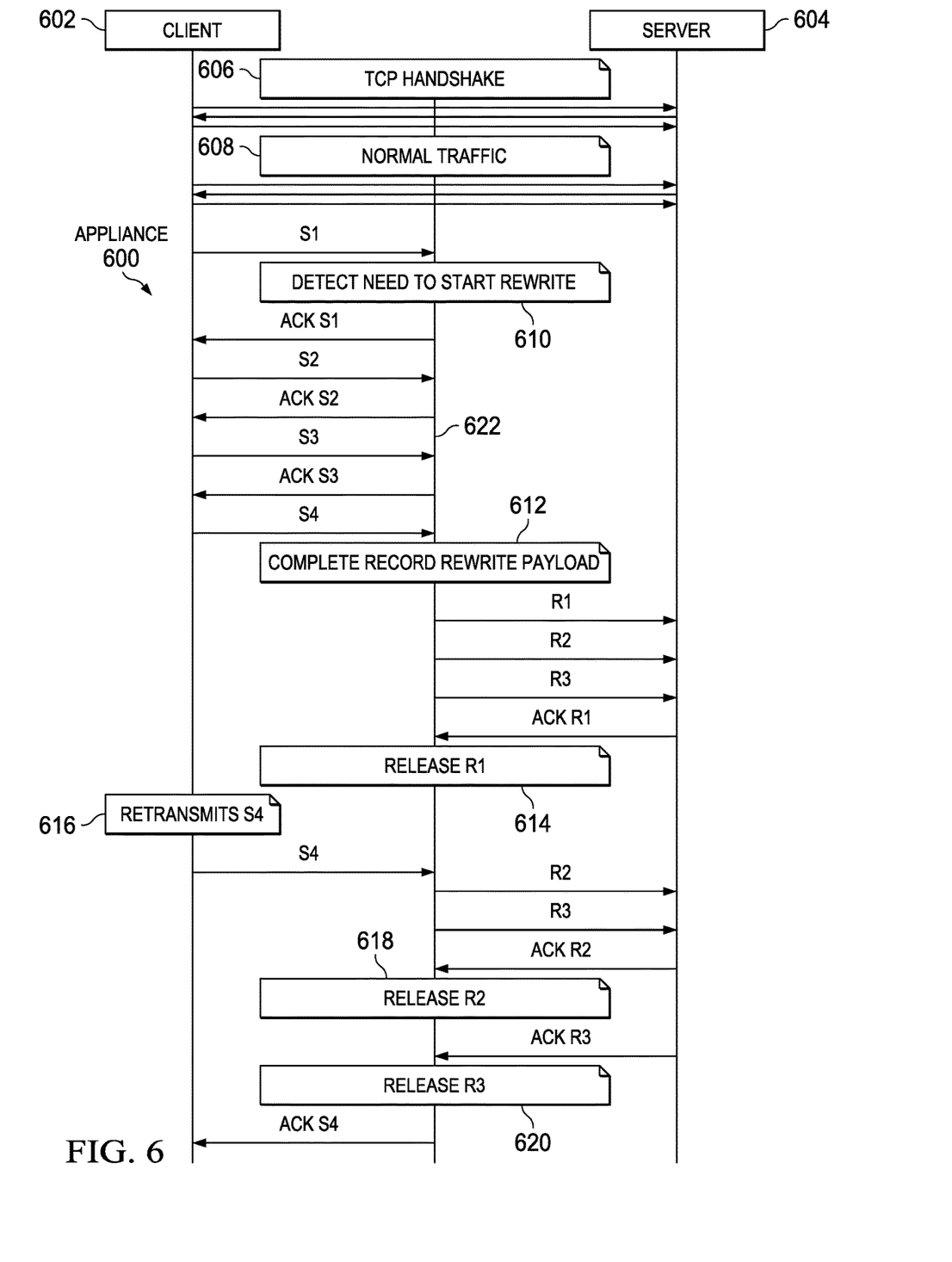
FIG. 6 illustrates a representative operation of the appliance during the content rewriting operation shown in FIG. 5.

FIG. 6 is a packet flow diagram illustrating the basic operating principles described in the example scenario above. In this example scenario, client 602 and server 604 execute a TCP handshake 606. The endpoints exchange normal traffic 608 through the appliance 600, which passively eavesdrops on the traffic flow. Upon receipt of input data packet S1, the appliance 600 (through its one or more inspection algorithms) determines that it needs to begin a REWRITE. This is step 610, and the appliance transitions from the NORMAL mode to the REWRITING mode. As described, the appliance then reads in (initializes) an input substitution record. Input data packet S1 is placed in that record and acknowledged, as are input data packets S2-S3. Input data packet S4 (or some portion thereof) completes the input substitution record, but this last data packet is not acknowledged. The appliance 600 completes the input substitution record at step 612 and rewrites the payload as required. The output rewritten record is created, and the appliance places output data packets R1-R3 into the traffic stream. The receiving entity is shown here (in this example) as acknowledging receipt of output data packet R1. As a result, the appliance releases R1 from the memory buffer. This is step 614. The process would continue in a similar manner with respect to the other output data packets but, in this example scenario the sending entity has retransmitted S4 at step 616 (because no acknowledgement was by then received). When the appliance receives the retransmitted input data packet S4, it retransmits output data packets R2-R3 (which remained not yet acknowledged by the receiving entity. Then, when the receiving entity acknowledges R2 and R3, each of the output data packets are released (the appropriate memory buffer cleared). These are steps 618 and 620. At step 622, and following the acknowledgement of all output data packets by the receiving entity, the appliance finally acknowledges the last input data packet. This completes the process for this particular input substitution record, and this particular output rewritten record. As noted above, there may be multiple such records created and used in this manner during a particular TCP session. The approach tracks any number of substitution records, limited only by available CPU and memory. As has been described, these records are used to overwrite/update TCP sequence and acknowledgement numbers for every TCP packet flowing through the appliance (and that is associated with a REWRITE). As also described, the substitution record length is variable, as variable length substitutions provide maximum flexibility to support various different types of content modification. Each type of modification may have different payload requirements and be based on a different rewrite/substitution algorithm. The replacement data can be smaller or larger than the substitution record, as the solution calculates and enforces (on acknowledgements) a positive or negative shift delta based on whether the modified stream has increased or decreased in size.

Without limitation, the above-described functionality may be implemented in one or more software routines executing in hardware in the appliance (or in virtualized equivalent structures). Thus, one software routine may be used to implement the inspection function. In one embodiment, this routine executes as a stateful inspection engine that performs byte-at-a-time parsing. A stateful parser produces the same output regardless of the input payload size. As noted, typically the REWRITE process begins when the inspection engine generates a protocol event based on network content. An event typically describes some interesting elements of a protocol, such as an HTTP header, an SSL record, or the like. The protocol event has start and end TCP sequence numbers. Data within these boundaries can then be replaced.

Another software routine may implement the particular substitution record functionality (e.g., instantiation of input substitution records, managing the substitution record table, generation of the output rewritten records, etc.). The substitution record algorithm that has been described above (see, for example, FIG. 6) works at both the packet and stream boundaries. This approach ensures that packets are correctly ordered and provides the necessary protocol field boundary hints (i.e., the start and end TCP sequence numbers). Because the rewriting procedure works at the packet boundary, the amount of data copying required is minimized. This solution thus provides nearly "zero-copy" operation.

One or more additional software routines may be used to provide the other described functionality, such as packet re-ordering (TCP stream reassembly), sequence number delta calculations and storing, buffer allocation and management, lost packet retransmission, and the like.

Of course, the above-described software routines may comprise a single integrated routine in whole or in part.

One or more of the described tables may be implemented as data structures.

The approach described above provides many advantages. It enables full TCP session rewriting while keeping the stream alive and without requiring a proxy. There is no need to maintain and/or use a TCP stack in the appliance. Thus, there is no need for TCP timers, context switching, connection termination, or connection re-origination. Arbitrary content may be inspected and rewritten (in a streaming manner), irrespective of the application. TCP sessions may be inspected on any port and irrespective of the application layer protocol used. As compared to traditional proxy solutions, the approach is more efficient, more reliable, and more scalable. No routing modifications are required, nor is there a requirement for expensive and complex network configuration.

While a preferred operating environment and use case (an inline, secure network appliance) has been described, the techniques herein may be used in any other operating environment in which it is desired to intercept, inspect and rewrite network traffic to and/or from a computing system or device.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various client-side architectures (e.g., firewalls, NAT devices), and in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the inspection and rewrite functions are implemented in software, which includes but is not limited to firmware, resident software, microcode, and the like. Furthermore, the inspection and rewriting functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the functionality is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The appliance is not limited to any particular type of appliance. As noted, the above-described operation may likewise be used to intercept, inspect and rewrite data from any machine, irrespective of the machine's physical configuration.

The techniques herein generally provide for the above-described improvements to a technology or technical field, as well as the specific technological improvements to network-connected appliances, such as described above.

Having described our invention, what we claim is as follows:

1. A method carried out in a device positioned between a pair of endpoints, each of which endpoints includes a TCP stack, comprising:
    inspecting a stream of TCP traffic flowing between the pair of endpoints, wherein said endpoints are dedicated to retransmission of data packets;
    as the stream of TCP traffic is flowing, and without TCP connection termination, selectively rewriting the stream of TCP traffic to generate rewritten data content;
    wherein selectively rewriting the stream includes generating, from the one or more input data packets in the input record, a modified portion of the stream, the modified portion being the rewritten data content and comprising one or more output data packets to be sent to a receiving endpoint entity such that a TCP connection tracking table, instead of a retransmission timer per connection, can keep track of the sequence numbers in both directions for each connection, and track endpoint-generated retransmitted packets and acknowledgement messages as they flow through the inline network appliance;
    in response to tracking endpoint-generated TCP acknowledgement messages as they flow unmodified through the device, controlling transmission of the rewritten data content;
    wherein the inspecting, rewriting and controlling operations are performed in software executing in one or more hardware elements and without using a TCP stack in the device, and without requiring termination or re-origination of a connection between the pair of endpoints;
    reassembling any out-of-order input data packets received from the sending endpoint entity prior to generating the modified portion of the stream.

2. The method as described in claim 1 wherein inspecting the stream comprises:
in response to determining that a portion of the stream is to be rewritten, the portion comprising one or more input data packets received from a sending endpoint entity, placing, in an input record, the one or more input data packets comprising the portion, the one or more input data packets including a last input data packet; and
returning to the sending endpoint entity an acknowledgement for each input data packet received except for the last input data packet.

3. The method as described in claim 2 wherein selectively rewriting the stream comprises:
placing in an output record the one or more output data packets; and
forwarding into the stream of TCP traffic to the receiving endpoint entity the one or more output data packets in the output record.

4. The method as described in claim 3 wherein tracking endpoint-generated TCP acknowledgement messages comprises:
upon receipt of acknowledgements from the receiving endpoint entity for the output data packets comprising the modified portion in the output record, transmitting to the sending endpoint entity an acknowledgement of the last input data packet of the one or more input data packets comprising the portion.

5. The method as described in claim 3 further including:
dropping any retransmit of the last input data packet that is received from the sending endpoint entity while any output data packet is not yet acknowledged by the receiving endpoint entity.

6. The method as described in claim 5 further including:
re-forwarding to the receiving entity each output data packet that is not yet acknowledged by the receiving endpoint entity.

7. An apparatus positioned between a pair of endpoints, each of which endpoints includes a TCP stack, comprising:
a processor;
computer memory holding computer program instructions executed by the processor, the computer memory holding computer program instructions comprising program code configured to:
inspect a stream of TCP traffic flowing between the pair of endpoints, wherein said endpoints are dedicated to retransmission of data packets;
as the stream of TCP traffic is flowing, and without TCP connection termination, selectively to rewrite the stream of TCP traffic to generate rewritten data content;
wherein selectively rewriting the stream includes generating, from the one or more input data packets in the input record, a modified portion of the stream, the modified portion being the rewritten data content and comprising one or more output data packets to be sent to a receiving endpoint entity such that a TCP connection tracking table, instead of a retransmission timer per connection, can keep track of the sequence numbers in both directions for each connection, and track endpoint-generated retransmitted packets and acknowledgement messages as they flow through the inline network appliance;
in response to tracking endpoint-generated TCP acknowledgement messages as they flow unmodified through the device, control transmission of the rewritten data content;
wherein the inspecting, rewriting and controlling operations are performed in software executing in one or more hardware elements and without using a TCP stack in the device, and without requiring termination or re-origination of a connection between the pair of endpoints;
reassemble any out-of-order input data packets received from the sending endpoint entity prior to generating the modified portion of the stream.

8. The apparatus as described in claim 7 wherein the program code configured to inspect the stream comprises program code that is further configured to:
in response to determining that a portion of the stream is to be rewritten, the portion comprising one or more input data packets received from a sending endpoint entity, place, in an input record, the one or more input data packets comprising the portion, the one or more input data packets including a last input data packet; and
return to the sending endpoint entity an acknowledgement for each input data packet received except for the last input data packet.

9. The apparatus as described in claim 7 wherein the program code configured to selectively rewrite the stream comprises program code that is further configured to:
place in an output record the one or more output data packets; and
forward into the stream of TCP traffic to the receiving endpoint entity the one or more output data packets in the output record.

10. The apparatus as described in claim 7 wherein the program code configured to track endpoint-generated TCP acknowledgement messages comprises program code that is further configured to:
upon receipt of acknowledgements from the receiving endpoint entity for the output data packets comprising the modified portion in the output record, transmit to the sending endpoint entity an acknowledgement of the last input data packet of the one or more input data packets comprising the portion.

11. The apparatus as described in claim 7 wherein the program code is further configured to:
drop any retransmit of the last input data packet that is received from the sending endpoint entity while any output data packet is not yet acknowledged by the receiving endpoint entity.

12. The apparatus as described in claim 11 wherein the program code is further configured to:
re-forward to the receiving endpoint entity each output data packet that is not yet acknowledged by the receiving endpoint entity.

13. A computer program product in a non-transitory computer readable medium for use in a data processing system positioned between a pair of endpoints, each of which endpoints includes a TCP stack, the computer program product holding computer program instructions executed by the data processing system, the computer program instructions comprising program code configured to:
inspect a stream of TCP traffic flowing between the pair of endpoints, wherein said endpoints are dedicated to retransmission of data packets;
as the stream of TCP traffic is flowing, and without TCP connection termination, selectively to rewrite the stream of TCP traffic to generate rewritten data content;
wherein selectively rewriting the stream includes generating, from the one or more input data packets in the input record, a modified portion of the stream, the modified portion being the rewritten data content and comprising one or more output data packets to be sent to a receiving endpoint entity such that a TCP connection tracking table, instead of a retransmission timer per connection, can keep track of the sequence numbers in both directions for each connection, and track endpoint-generated retransmitted packets and acknowledgement messages as they flow through the inline network appliance;

in response to tracking endpoint-generated TCP acknowledgement messages as they flow unmodified through the device, control transmission of the rewritten data content;

wherein the inspecting, rewriting and controlling operations are performed in software executing in one or more hardware elements and without using a TCP stack in the device, and without requiring termination or re-origination of a connection between the pair of endpoints;

reassemble any out-of-order input data packets received from the sending endpoint entity prior to generating the modified portion of the stream.

14. The computer program product as described in claim 13 wherein the program code configured to inspect the stream comprises program code that is further configured to:

in response to determining that a portion of the stream is to be rewritten, the portion comprising one or more input data packets received from a sending endpoint entity, place, in an input record, the one or more input data packets comprising the portion, the one or more input data packets including a last input data packet; and return to the sending endpoint entity an acknowledgement for each input data packet received except for the last input data packet.

15. The computer program product as described in claim 14 wherein the program code configured to selectively rewrite the stream comprises program code that is further configured to:

place in an output record the one or more output data packets; and forward into the stream of TCP traffic to the receiving endpoint entity the one or more output data packets in the output record.

16. The computer program product as described in claim 15 wherein the program code configured to track endpoint-generated TCP acknowledgement messages comprises program code that is further configured to:

upon receipt of acknowledgements from the receiving endpoint entity for the output data packets comprising the modified portion in the output record, transmit to the sending endpoint entity an acknowledgement of the last input data packet of the one or more input data packets comprising the portion.

17. The computer program product as described in claim 15 wherein the program code is further configured to:

drop any retransmit of the last input data packet that is received from the sending endpoint entity while any output data packet is not yet acknowledged by the receiving endpoint entity.

18. The computer program product as described in claim 17 wherein the program code is further configured to:

re-forward to the receiving endpoint entity each output data packet that is not yet acknowledged by the receiving endpoint entity.

* * * * *